Patented Dec. 24, 1935

2,025,587

UNITED STATES PATENT OFFICE 2,025,587

ARYLIDES OF 4-HYDROXY-DIPHENYL-3-CARBOXYLIC ACID

Oskar Haller, Offenbach-on-the-Main, and Heinrich Morschel, Cologne-Deutz, Germany, assignors to General Aniline Works, Inc., New York, N. Y., a corporation of Delaware No Drawing. Application March 11, 1935, Serial No. 10,582. In Germany March 13, 1934

5 Claims. (Cl. 260—124)

The present invention relates to arylides of 4-hydroxydiphenyl-3-carboxylic acid, more particularly it relates to compounds of the following general formula:

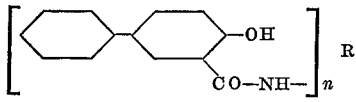

wherein $n$ means the number 1 or 2 and R stands for a radical of the benzene, naphthalene, diphenyl or carbazole series.

We have found that the 4-hydroxydiphenyl-3-carboxylic acid may be converted into its arylides by condensing it with arylamines according to known methods.

The new arylides of the 4-hydroxydiphenyl-3-carboxylic acid thus obtained are distinguished in comparison with known comparable arylides from ortho-hydroxycarboxylic acids of the benzene series by an increased affinity for the vegetable fiber.

The new arylides may, for instance, be formed, by heating 4-hydroxydiphenyl-3-carboxylic acid with the arylamines in the presence of condensing agents and, if necessary, in suspending agents or solvents, or by first preparing the chloride of the acid and then condensing it with the arylamines.

As arylamines there may be used, for instance, aniline or a homologue or analogue thereof; or an alkoxyarylamine; or a halogen- or nitro-substitution product of the said arylamines, or a diamine, such as, a diamine of the benzene series or diphenyl series, a diamino-naphthalene; or a diamine derived from a ring system having rings connected by an intermediate member, as for instance, diamino-diphenylamine, diamino-carbazole or the like.

The following examples serve to illustrate the invention, but they are not intended to limit it thereto; the parts are by weight.

(1) To a suspension consisting of 214 parts of 4-hydroxydiphenyl-3-carboxylic acid in 2000 parts of toluene there are added 93 parts of aniline and the mixture is heated to 60° C. In the course of an hour 70 parts of phosphorus trichloride are added, drop by drop, and the whole is heated to boiling for 10 hours. Sodium carbonate is then added until there is an alkaline reaction. The toluene is then distilled with steam, the reaction product is filtered with suction and the solid matter dissolved in caustic soda solution; the solution obtained is filtered and carbon dioxide is introduced. The 4-hydroxydiphenyl-3-carboxylic acid anilide thus precipitated crystallizes from alcohol and melts at 231° C.

(2) 428 parts of 4-hydroxydiphenyl-3-carboxylic acid and 244 parts of dianisidine are introduced into 5000 parts of toluene; into the mixture heated to 60° to 70° C., 140 parts of phosphorus trichloride are introduced, drop by drop. The whole is further heated to boiling for 10 hours. Sodium carbonate is then added until there is an alkaline reaction. The toluene is distilled with steam. The residue is filtered with suction and the solid matter boiled with dilute hydrochloric acid in order to eliminate the unchanged dianisidine, washed and dissolved in dilute caustic soda solution. The solution is filtered and carbon dioxide is introduced. The condensation product from 2 mols of 4-hydroxydiphenyl-3-carboxylic acid and 1 mol of dianisidine thus precipitated crystallizes from anisole and melts at 287° C.

In the same manner there are obtained, for instance, some other 4-hydroxydiphenyl-3-carboxylic acid-arylides, the properties of which are illustrated in the following table:

| 4-hydroxydiphenyl-3-carboxylic acid condensed with— | Recrystallized from— | Melting point— Degrees centigrade |
|---|---|---|
| 1-amino-2-methoxybenzene | Alcohol | 155 |
| 1-amino-2-methylbenzene | Chlorobenzene | 208 |
| 1-amino-3-methylbenzene | Chlorobenzene | 222 |
| 1-amino-4-methylbenzene | Chlorobenzene | 244 |
| 1-amino-2,4-dimethylbenzene | Chlorobenzene | 217 |
| 1-amino-4-chlorobenzene | Anisole | 268 |
| 2-amino-naphthalene | Anisole | 240 |
| 3,6-diaminocarbazole | Nitrobenzene | 332–334 |
| 1,4-diaminobenzene | Nitrobenzene | 383–384 |
| 4,4'-diaminostilbene | Nitrobenzene | 392–394 |
| 4,4'-diaminodiphenylmethane | Dichlorobenzene | 305–307 |
| 1,5-diaminonaphthalene | Nitrobenzene | 357–358 |
| 1-amino-4-nitrobenzene | Dichlorobenzene | 253–255 |

We claim:

1. The compounds of the following general formula:

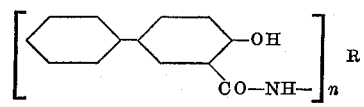

wherein $n$ means the number 1 or 2 and R stands for a radical of the benzene, naphthalene, diphenyl or carbazole series, being crystallized compounds soluble in high-boiling organic solvents and possessing a high affinity for the vegetable fiber.

2. The compounds of the following general formula:

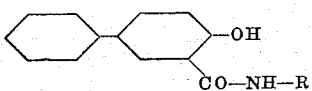

wherein R stands for a radical of the benzene series, being crystallized compounds soluble in high-boiling organic solvents and possessing a high affinity for the vegetable fiber.

3. The compound of the following formula:

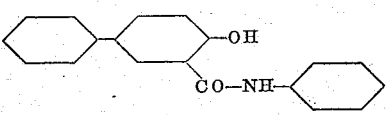

being a white powder which melts, when recrystallized from alcohol, at 231° C. and possesses a high affinity for the vegetable fiber.

4. The compound of the following formula:

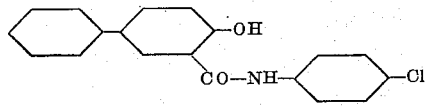

being a light gray powder which melts, when recrystallized from anisole, at 268° C. and possesses a high affinity for the vegetable fiber.

5. The compound of the following formula:

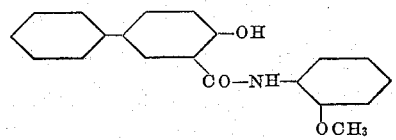

being a violet-gray powder which melts, when recrystallized from alcohol, at 155° C. and possesses a high affinity for the vegetable fiber.

OSKAR HALLER.
HEINRICH MORSCHEL.